United States Patent [19]

Arnold

[11] Patent Number: 5,539,370
[45] Date of Patent: Jul. 23, 1996

[54] INDUCTIVE MOTOR PROTECTIVE CIRCUIT BREAKER

[75] Inventor: David Arnold, Chester, Conn.

[73] Assignee: General Electric Company, New York, N.Y.

[21] Appl. No.: 390,842

[22] Filed: Feb. 17, 1995

[51] Int. Cl.⁶ .................................................. H01H 83/00
[52] U.S. Cl. ............................................. 337/8; 337/2
[58] Field of Search ................................... 337/2, 4, 5, 8, 337/9, 142, 148, 150; 335/16, 147, 195

[56] References Cited

U.S. PATENT DOCUMENTS

| | | |
|---|---|---|
| 4,329,669 | 5/1982 | Krasser et al. ........................... 337/2 |
| 4,649,455 | 3/1987 | Scott . |
| 4,754,247 | 6/1988 | Raymont . |
| 4,884,164 | 11/1989 | Dziura . |
| 4,949,060 | 8/1990 | Mikulecky ................................. 337/4 |
| 4,967,304 | 10/1990 | Dougherty . |

*Primary Examiner*—Lincoln Donovan
*Attorney, Agent, or Firm*—Richard A. Menelly

[57] ABSTRACT

A molded case circuit breaker and current suppressing unit protects an electric motor without tripping during motor current reversal. Upon the occurrence of a short circuit within the protected circuit, the current suppressing feature rapidly suppresses the let-through current until the circuit breaker responds to isolate the protected equipment. Power is restored to the protected equipment without the need to replace any of the current suppressing unit components.

6 Claims, 3 Drawing Sheets

INDUCTIVE MOTOR PROTECTIVE CIRCUIT BREAKER

BACKGROUND OF THE INVENTION

When the electric motors within machine tool cutting operations are reversed to change the direction of the cutting tools, large inrush currents are temporarily generated. To prevent circuit interruption each time the operations are reversed, fuses are generally required in series with thermal overload relays, which protect the motor and associated equipment upon the occurrence of a true overload condition. The fuses, however, must be replaced on a periodic basis due to thermal aging when subjected to repeated high currents. With the introduction of high efficiency motors that operated at lower operating currents and higher inrush currents, higher fuse ratings are selected to sustain the higher inrush currents and resist thermal aging. U.S. patent application Ser. No. 08/262,394, filed Jun. 15, 1994 entitled "Induction Motor Protective Circuit Breaker Unit" describes the selection of the fuse rating and circuit breaker parameters to reduce the thermal damage to the fuse and to allow coordination with the thermal overload relays commonly employed within electrical motor protective circuits. However, such higher-rated fuses find limited application outside the tool-making industry.

U.S. Pat. No. 4,884,164 describes an industrial-rated circuit breaker having an electronic trip unit that is adjustable over a wide range of long and short time over-current conditions.

U.S. Pat. No. 4,967,304 describes a digital circuit interrupter with electric motor trip parameters that includes control algorithms tailored for motor protection applications.

U.S. patent application Ser. No. 08/189,613 filed Jan. 31, 1994 entitled "Current Limiter for Molded Case Circuit Breakers" describes a current suppressing unit which rapidly suppresses the short circuit current to a substantially lower value without fusing.

It would be economically advantageous to have a combined electronic trip circuit breaker and current suppressing unit which is not susceptible to thermal aging, does not fuse, and does not require periodic replacement when used in tool making operations.

One purpose of the invention is to provide a combined circuit breaker and current suppressing unit that does not interrupt the protected circuit upon motor reversal and can be adjusted to provide coordination with the thermal overload relay.

Summary of the Invention

The invention comprises an inductive motor protective circuit breaker that includes an electronic trip unit and a non-fusing current suppressing unit. The combination provides coordinated circuit protection with a thermal overload relay when a high efficiency electric motor is used within a tool-making environment. The electronic trip unit within the circuit breaker is adjusted for short time over-current protection. The current suppressing unit rapidly suppresses the short circuit let-through current until the coordinated circuit breaker responds to isolate the protected equipment.

DESCRIPTION OF THE PREFERRED EMBODIMENT

Figure 1:
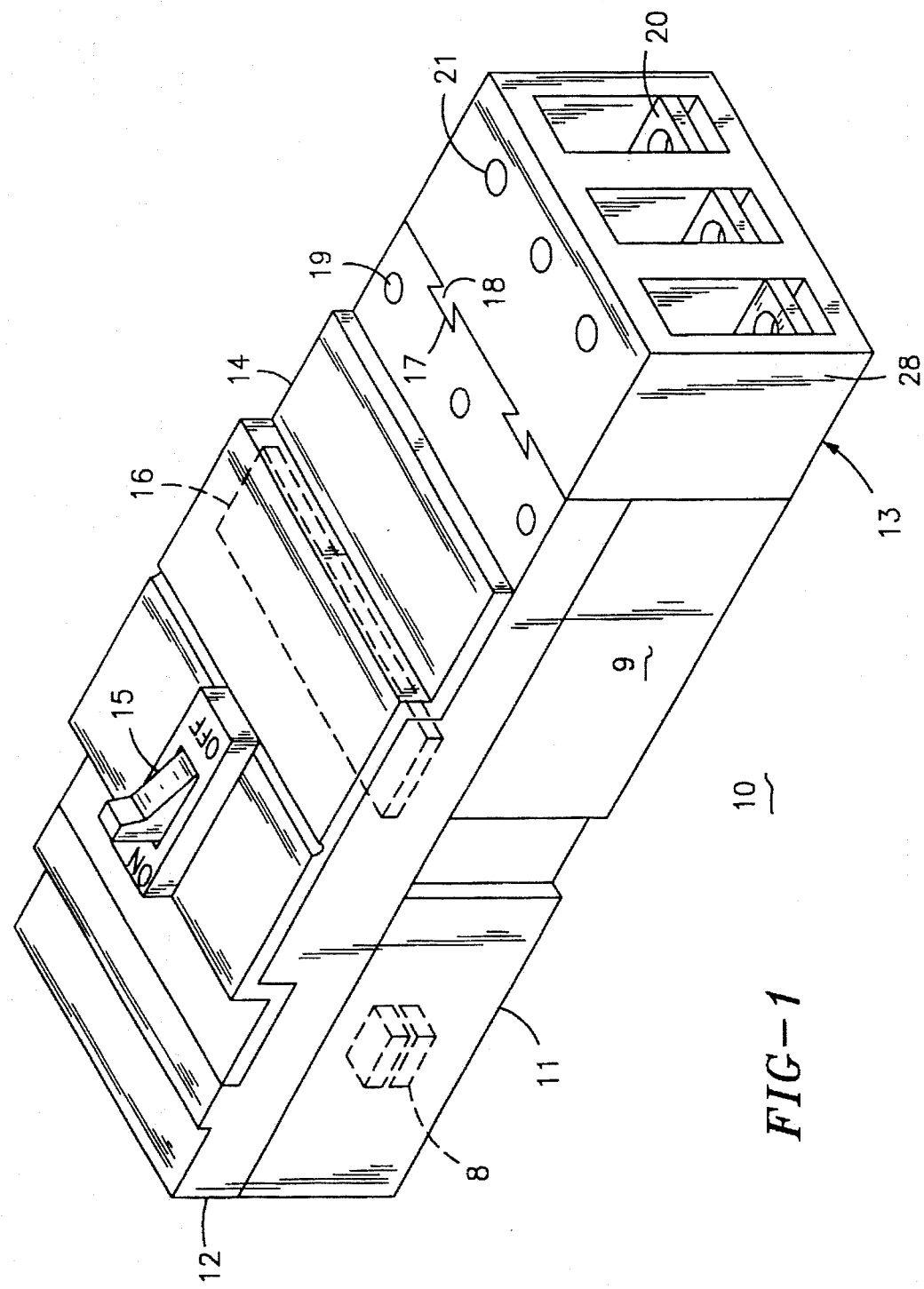
FIG. 1 is a top perspective view of the inductive motor protective circuit breaker unit in accordance with the invention.
Figure 2:
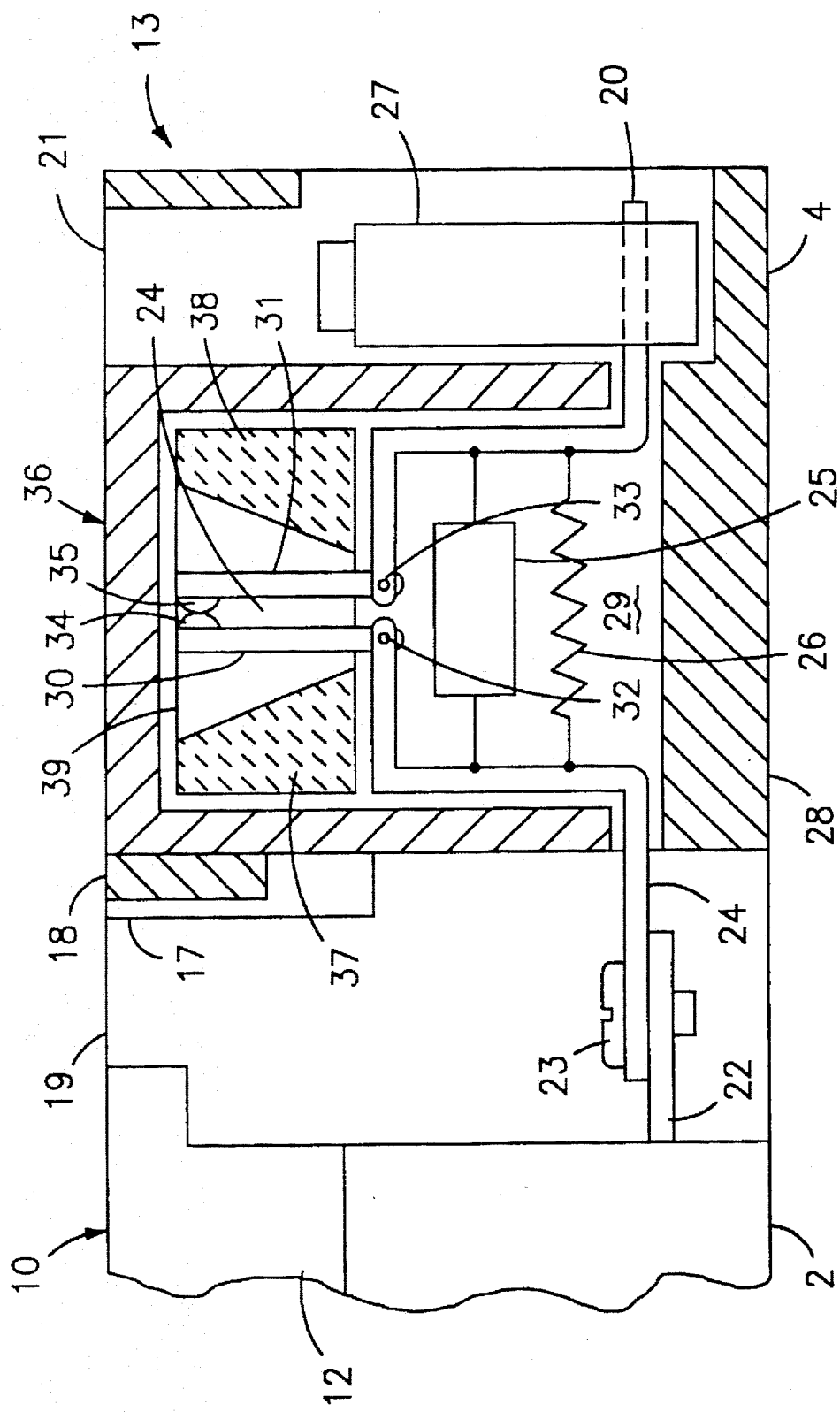
FIG. 2 is a side view in partial section of the current suppressing unit within the circuit breaker unit of FIG. 1.

The motor protective circuit breaker unit 10 shown in FIG. 1, consists of an electronic circuit breaker 9 such as that described in the aforementioned U.S. Pat. No. 4,884,164 to which a current suppressing unit 13 is attached. The electronic circuit breaker includes a circuit breaker case 11 and circuit breaker cover 12 to which an accessory cover 14, as described in U.S. Pat. No. 4,754,247, is attached on opposite sides of the operating handle 15. The electronic trip unit 16 contained within the circuit breaker cover is described within U.S. Pat. No. 4,649,455. The current suppressing unit 13, which operates in the manner described in the aforementioned U.S. Pat. No. application Ser. No. 08/189,613, is fixedly attached to the circuit breaker case 11 and cover 12 by means of dovetail projections 18, formed on the current suppressing unit case 28, engaging dovetail slots 17, within the circuit breaker cover 12. Screws 23, shown in FIG. 2, are accessed through the top openings 19 to provide additional attachment if desired. The load terminals 20 are arranged for connection with the protected electrical equipment and are electrically accessed by means of the additional top openings 21.

The current suppressing unit 13 is depicted in FIG. 2 to detail the connection between the dovetail projections 18 on the current suppressing unit 13 and the dovetail slots 17 integral with the circuit breaker cover 12. The straps 24 leading from the current suppressing unit are securely attached to the circuit breaker terminals 22 by means of screws 23, which are accessed through the top openings 19. As described in the aforementioned U.S. Pat. application Ser. No. 08/189,613, the current suppressing unit comprises a positive temperature coefficient resistor 25, herein PTCR, electrically connected in parallel with an ohmic resistor 26, and electrically connected in series with the straps 24 and the load terminals 22. A pair of movable contact arms 30 and 31, which are electrically connected in parallel with the PTCR are pivotally attached to the straps 24 and load terminals 20 as depicted at 32 and 33. The movable contact arms 30,31, and movable contacts 34,35, are arranged within a slot motor 36 consisting of a pair of transformer core laminations 37,38 joined by a yoke 39. Lugs 27, accessed through the top openings 21, are attached to the load terminals 20 to provide cabling means to the protected electrical equipment.

Figure 3:
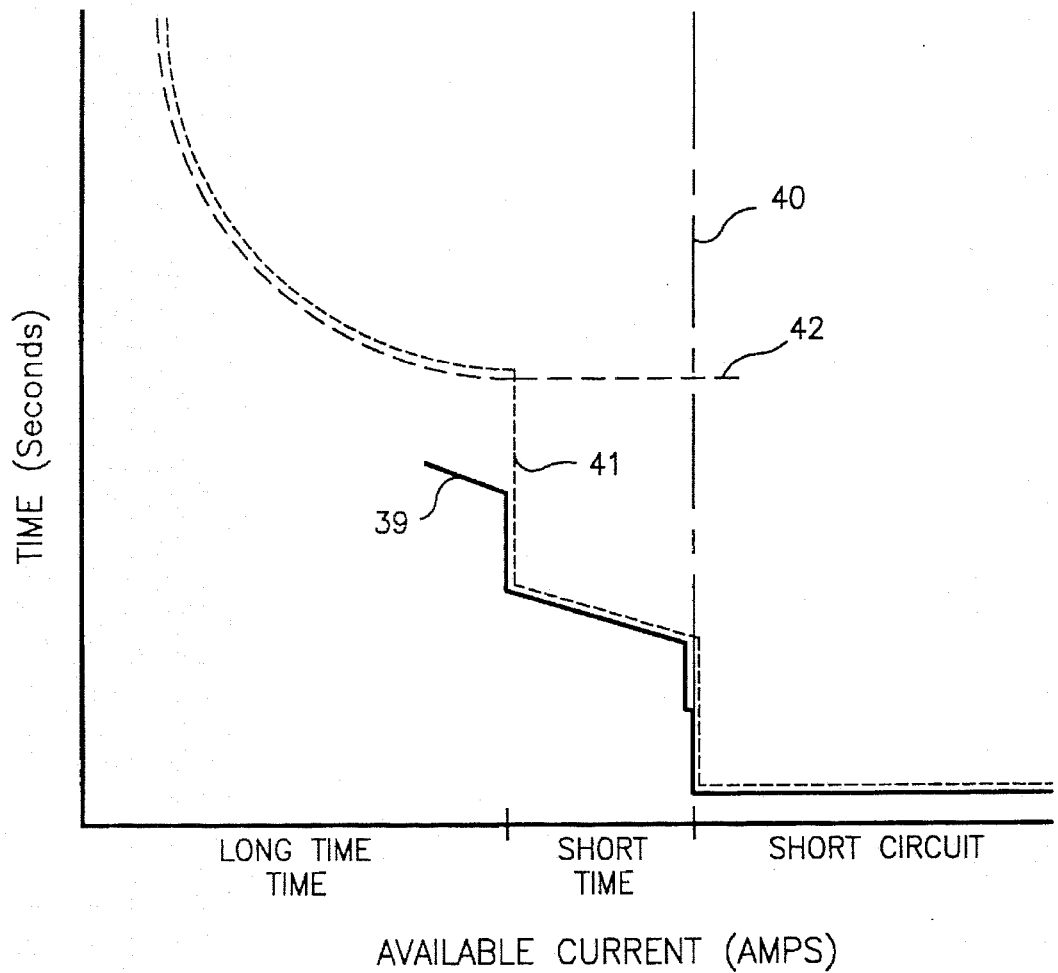
FIG. 3 is a graphic representation of the over-current protection coordination provided by the inductive motor protective circuit breaker unit of FIG. 1.

The aforementioned U.S. patent application Ser. No. 08/189,613 describes an inductive motor protective circuit breaker unit capable of providing type-2 protection, which is described in I.E.C. standard 947-4-1. The inverse time-current operating characteristics of the motor protective circuit breaker unit 10, according to the invention, and a standard thermal overload relay are depicted in FIG. 3. The thermal overload relay protection profile 42 extends across the long time and short time intervals, whereas the electronic trip unit protection profile 39 extends across the long time, short time and short circuit intervals. The current suppressing unit protection profile 40 is contained within the short circuit interval. The composite protection profile 41 is constructed from the lesser of the three aforementioned protection profiles within each of the aforementioned intervals. It is noted that the electronic trip unit coordinates with the thermal overload relay in the long time and short time intervals, and the current suppressing unit coordinates with the electronic trip unit in the short time and short circuit intervals.

The operation of the motor protective circuit breaker unit 10 of FIG. 1 in circuit with a thermal overload relay (not shown) is best understood by referring jointly to FIGS. 1–3. With the passage of normal operating current in the protected circuit, the thermal overload relay and motor protective circuit breaker unit 10 are in a quiescent state. Upon the occurrence of a short circuit, the current suppressing unit 13 rapidly suppresses the prospective let-through short circuit current as described in the aforementioned U.S. patent application Ser. No. 08/189,613. Coordination between the current suppressing unit and the electronic trip unit 16 within the electronic circuit breaker 9 ensures that the circuit breaker will receive and respond to a trip signal, as described in the aforementioned U.S. Pat. No. 4,884,164, effectively isolating the protected equipment.

A motor protective circuit breaker unit has herein been described having a current suppressing unit connected in series with an electronic circuit breaker having an electronic trip unit. The motor protective circuit breaker unit provides long time and short circuit protection to the motor and associated equipment and wiring in accordance with type-2 protection under I.E.C. standard 947-4-1 without requiring periodic replacement.

I claim:

1. An inductive motor protective circuit breaker unit comprising:

a circuit breaker case and cover;

a pair of circuit breaker contacts within said circuit breaker case for interrupting circuit current upon command;

an electronic trip unit within said circuit breaker cover and arranged for separating said circuit breaker contacts upon occurrence of a long time or short time overcorrect circuit condition;

a current limiter case;

a pair of movable contact arms within said current limiter case arranged for automatic separation by means of magnetic repulsion upon occurrence of a short circuit condition;

a pair of current limiter contacts, one of said current limiter contacts being arranged on one end of one of said movable contact arms for transport of circuit current between said contacts upon quiescent current conditions, and for interruption of circuit current when said movable contact arms become separated by magnetic repulsion;

a PTC device within said current limiter case electrically-connected with said moveable contact arms; and a metallic resistor within said current limiter case electrically-connected with said PTC device and said moveable contact arms whereby circuit current transfers from said movable contacts to said PTC device and said metallic resistor when said movable contacts become separated.

2. The inductive motor protective circuit breaker unit of claim 1 wherein said PTC device comprises a conductive polymer.

3. The current limiter of claim 1 further including a magnetic slot motor arrange about said moveable contact arms to enhance separation of said moveable contact arms upon occurrence of said overcorrect condition.

4. The current limiter of claim 1 wherein said metallic resistor comprises tungsten of tantalum.

5. The current limiter of claim 1 wherein said circuit breaker case is connected to said current limiter case by dove tail projections.

6. The current limiter of claim 1 wherein said circuit breaker contacts and said current limiter contacts are electrically-connected in series.

* * * * *